United States Patent [19]

Masuda et al.

[11] 4,424,467
[45] Jan. 3, 1984

[54] CATHODE-RAY TUBE HAVING A MIXTURE OF LONG AND SHORT PERSISTENCE PHOSPHORS

[75] Inventors: Mutsuo Masuda, Kyoto; Yasuyuki Takagi; Shigeya Ashizaki, both of Takatsuki, all of Japan

[73] Assignee: Matsushita Electronics Corporation, Kadoma, Japan

[21] Appl. No.: 433,007

[22] Filed: Oct. 6, 1982

Related U.S. Application Data

[63] Continuation of Ser. No. 164,935, Jul. 1, 1980, abandoned.

[30] Foreign Application Priority Data

Jul. 4, 1979 [JP] Japan ................................ 54-84647

[51] Int. Cl.³ .............................................. H01J 29/10
[52] U.S. Cl. ...................................... 313/467; 313/473
[58] Field of Search ........................ 313/467, 473, 468

[56] References Cited

U.S. PATENT DOCUMENTS 3,742,291 6/1973 Yamada ........................... 313/468 X
3,911,310 10/1975 Galves et al. ......................... 313/473
3,919,584 11/1975 Galves et al. ......................... 313/473

Primary Examiner—Palmer C. Demeo
Assistant Examiner—Sandra L. O'Shea
Attorney, Agent, or Firm—Cushman, Darby & Cushman

[57] ABSTRACT

A cathode-ray tube has a phosphor screen which is made by using a mixture of a long persistent phosphor and a short persistent phosphor. A light emission from the short persistent phosphor has a spike figure, so that a light pen can have sufficient sensitivity therefor, and a light emission from the long persistent phosphor is continuous within the one cycle period of the frame frequency, so that flicker is not noticeable.

7 Claims, 4 Drawing Figures

CATHODE-RAY TUBE HAVING A MIXTURE OF LONG AND SHORT PERSISTENCE PHOSPHORS

This is a continuation of application Ser. No. 164,935, filed July 1, 1980, and now abandoned.

BACKGROUND OF THE INVENTION

1. Field of the Invention

The present invention relates to a cathode-ray tube, phosphor screen which is formed by a mixture of long persistent phosphor and short persistent phosphor.

2. Description of the Prior Art

A phosphor screen of a conventional cathode-ray tube has been made by using a kind of phosphor, which has, for example, a long persistent phosphor characteristic or a short persistent phosphor in accordance with its use.

Generally speaking, the frame frequency of a television receiver is about 60 Hz, and then a P-22 type phosphor (Joint Electron Device Engineering Councils, USA) is ordinarily used for a phosphor screen of a color picture tube for the television receiver. Such cathode-ray tubes have become widely used not only for a picture tube of the television receiver but also for an apparatus for industrial uses, for example, a terminal display device of a computer, or a graphic display device. In case the cathode-ray tubes are used for such display devices, a video signal circuit for driving the cathode-ray tube desirably has as much wide frequency as possible in order to reproduce informations in one frame as much as possible.

The frequency range of the video signal circuit is decided by a product of the frame frequency and a frequency range of the video signal. Therefore if the frame frequency can be reduced to about 25 Hz, then the frequency range of the video signal can be widened two times (twice) that of conventional one, or the frequency range of the video signal circuit can be reduced to half of that of the conventional one. For such cathode-ray tube having long persistent phosphor screen, its 10% persistent time (a time period that the brightness of phosphor screen after excitation by electron beam reduces to one-tenth of the initial value) should be preferably over 10 ms (milli seconds).

On the contrary, as far as using of a light pen is considered, it is desirable for the display device that the screen of the cathode-ray tube should be made of a phosphor of a quick rising-up characteristic in order to obtain sufficient light output when excited by an electron pulse, and such high rising-up phosphor has a short persistent characteristic.

SUMMARY OF THE INVENTION

The present invention provides a cathode-ray tube which can satisfy the abovementioned two contradictive requirements, namely long persitent characteristic and short persistent characteristic of the phosphor screen.

DESCRIPTION OF PREFERRED EMBODIMENT

Figure 3:
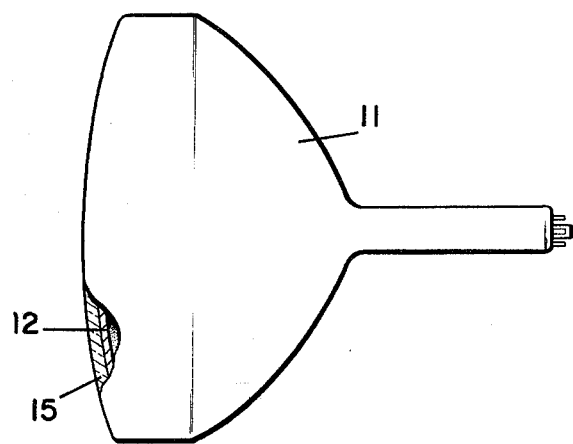
FIG. 3 is a side view of a typical cathode ray tube.
Figure 4:
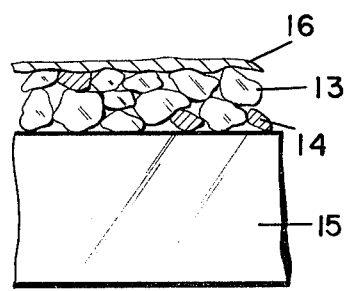
FIG. 4 is a sectional view of a part of the cathode ray tube showing the mixture of long persistence phosphor and short persistence phosphor in accordance with the invention.

Referring to FIGS. 3 and 4, the cathode-ray tube 11 of the present invention has a phosphor screen 12 which is formed by a mixture of a long persistent phosphor 13 having one-tenth persistent time of 10 msec or more and a short persistent phosphor 14 having one-tenth persistent time of 1 $\mu$sec or less. In accordance with known techniques, a face panel 15 and metal base 16 are provided. And the mixing ratio of the short persistent phosphor in the mixture is set up in a range of 5 to 20%.

Figure 1:
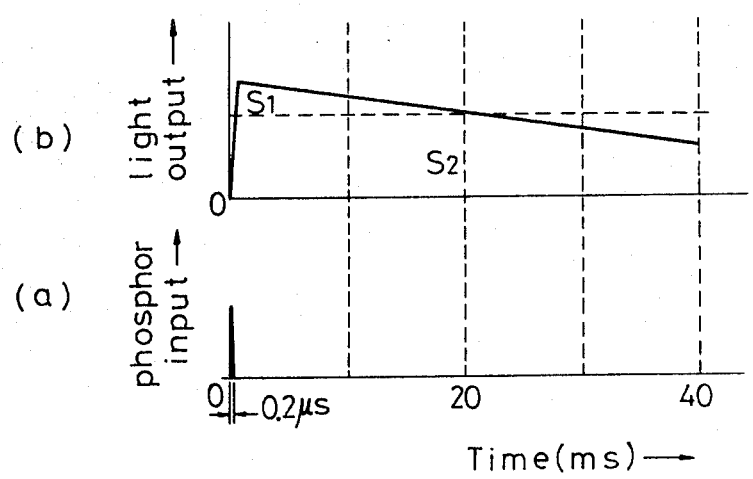
FIG. 1(a) is a graph showing an oscillogram of a phosphor input.
FIG. 1(b) is a graph showing an oscillogram of light output of a conventional cathode-ray tube whose phosphor screen is formed by known manganese- and arsenic-activated zinc silicate phosphor ($Zn_2SiO_4$:Mn, As), in case it is driven at a frame frequency of 25 Hz.

It is known that a phosphor screen made of manganese- and arsenic-activated zinc silicate ($Zn_2SiO_4$:Mn, As) is one of long persistent phosphor screens. One-tenth persistent time of this phosphor screen is about 120 msec and persistence characteristic when a phosphor input shown in FIG. 1(a) is applied to the phosphor screen is as shown in FIG. 1(b). The flicker index thereof is 0.21.

The flicker index is an index defined by Eastman et al. to express an aspect of flicker quantitatively. The flicker index is defined by ($S_1/S_1+S_2$), where $S_1$ is the light amount which is above the mean value level (indicated by a horizontal dotted line in FIG. 1(b)) of the light output and $S_2$ is the light amount which is under the mean value level. Namely, the flicker index is the ratio of the light amount $S_1$ which is above the mean value level to the mean value of the whole light amount, and the flicker index indicate nature of the time change of the light. The larger the flicker index becomes, the higher the critical fusion frequency (hereinafter is referred to as CFF) becomes, which is a sensible minimum frequency of a flicker.

Figure 2:
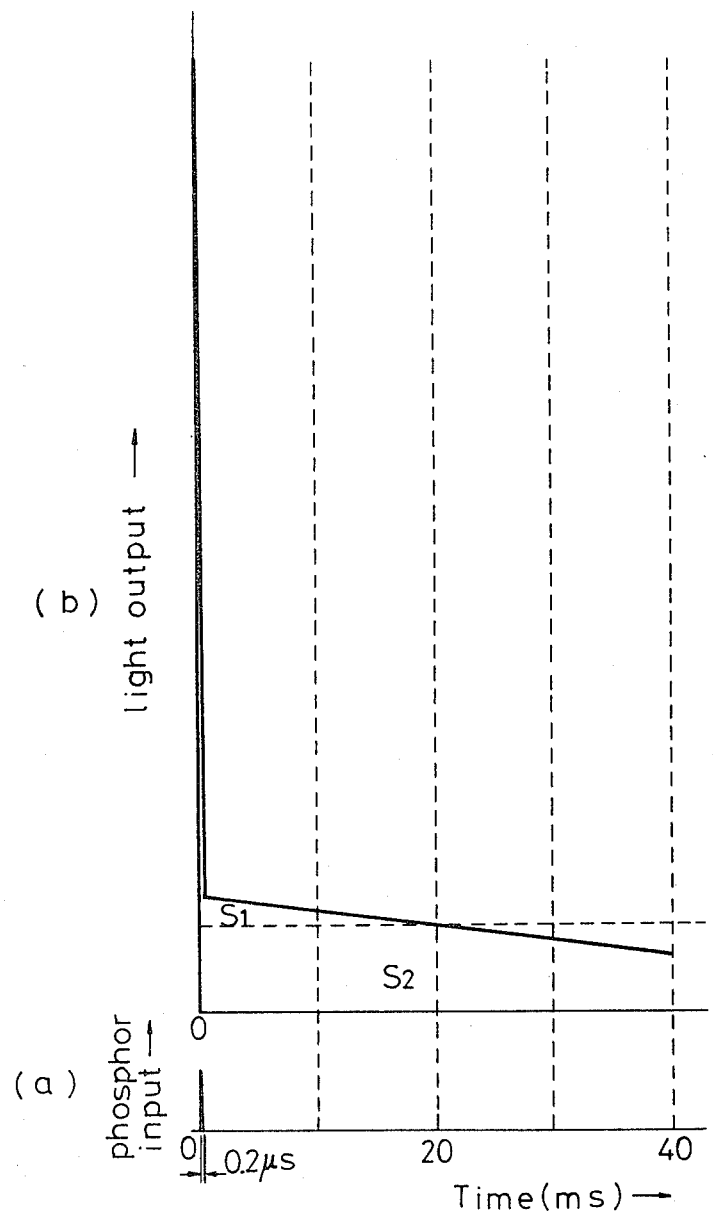
FIG. 2(a) is a graph showing an oscillogram of a phosphor input.
FIG. 2(b) is a graph showing an oscillogram of light output of the cathode-ray tube in accordance with the present invention, in case it is driven at the frame frequency of 25 Hz.

When the phosphor input as shown in FIG. 2(a) is applied in the phosphor screen, the persistence characteristic of an embodiment of the present invention becomes as shown in FIG. 2(b). In this case the frame frequency is set at 25 Hz, and then the one cycle period is 40 msec. The phosphor of a mixture of manganese- and arsenic-activated zinc silicate ($Zn_2SiO_4$:Mn, As) as a long persistent phosphor and a phosphor of cerium-activated yttrium aluminate ($Y_3Al_5O_{12}$:Ce) as a short persistent phosphor blended in the weight ratio 95:5 is used for a phosphor screen. The one-tenth persistent time of the cerium-activated yttrium aluminate is below $10^{-7}$ sec which is of the same order as the excitation period of electron beam (0.2 $\mu$sec) and corresponds to 1/100,000 of one cycle period (40 msec).

When the phosphor screen is excited by electron beam, the light amount of spike shaped persistence characteristic light generated from the short persistent phosphor is only 1 to 2% of whole light amount, and then the flicker index remains about 0.2. Therefore the CFF value does not extremely increase due to the addition of the short persistent phosphor.

Since the light pen applied for the phosphor screen ordinarily uses a silicon photo-diode as a light receiving element, responce speed thereof is about 1 $\mu$sec. Therefore, the light pen is not sensitive at all to the conventional phosphor screen as of FIG. 1(b) and is sufficiently sensitive to the phosphor screen as shown in FIG. 2(b).

As the weight ratio of short persistent phosphor increases, the sensitivity of light pen becomes better, while the CFF value increases, and thereby the cathode-ray tube becomes disadvantageous with respect to flicker characteristic. Inventors recognize by experiments that it is desirable that the mixing weight ratio of the short persistent phosphor in the mixture is within 5 to 20 weight %. Though mixing weight ratio of the short persistent phosphor in the mixture should be as small as possible, the light pen cannot sufficiently receive light output from the phosphor screen for mixing weight ratio of below 5%. On the other hand, in case the mixing weight ratio of the short persistent phosphor is over 20%, the CFF value becomes large making liable to flicker, and furthermore the brightness of the phosphor screen decreases. Embodiments of the present invention are elucidated below:

EXAMPLE 1

95 g of manganse- and arsenic-activated zinc silicate phosphor ($Zn_2SiO_4$:Mn, As) of about 8 to 10 $\mu$m mean diameter, as the long persistent phosphor, and 5 g of cerium-activated yttrium aluminate phosphor ($Y_3Al_5O_{12}$:Ce) of about 8 to 10 82 m mean diameter as the short persistent phosphor, as well mixed and a slurry of the mixed phosphor is applied to the inner face of the face panel part of glass bulb by a well known sedimentation method, thereby the phosphor screen is produced. A picture tube is completed through several known processes such as metal backing, etc. When a light pen available in the market using silicon photo diode as its light receiving device is used to touch the phosphor screen, good light receiving sensitivity is obtained. As the brightness of the phosphor screen is concerned, though it is 1 to 2% lower than that of a phosphor screen excluding the short persistent phosphor particles, there is no noticeable flicker when the frame frequency is set at 30 Hz. This mixture phosphor can be applied for a green component of color picture tube.

EXAMPLE 2

80 g of manganese- and arsenic-activated zinc silicate phosphor ($Zn_2SiO_4$:Mn, As) of about 8 to 10 $\mu$m mean diameter as the long persistent phosphor, and 20 g of cerium-activated yttrium silicate phosphor ($Y_2SiO_5$:Ce) of about 7 to 9 $\mu$m mean diameter, as the short persistent and near ultraviolet phosphor, are well mixed, and a picture tube screen is formed in the similar process as mentioned above. In this case, the known light pen available in the market can well respond to this picture tube. Though a little flicker is noticed when the frame frequency is 25 Hz, there is no serious problem when it is set at 30 Hz.

EXAMPLE 3

About 85 g of manganese-activated magnesium silicate phosphor ($MgSiO_3$:Mn) of about 5 to 6 $\mu$m mean diameter, as the long persistent red phosphor, and 15 g of europium-activated calcium sulfide phosphor (CaS:Eu) of about 5 to 6 mean diameter as the short persistent deep red phosphor are well mixed, and a picture tube screen is formed by using the mixture and in the similar process as the aforementioned examples. The persistence characteristic of this picture tube is similar to that of FIG. 2(b). The known light pen available in the market can also respond to this picture tube, and flicker is not noticed when the frame frequency is set at 30 Hz.

Besides the abovementioned $Zn_2SiO_4$:Mn,As phosphor or $MgSiO_3$:Mn phosphor as the long persistent phosphor, other phosphors such as manganese-activated zinc phosphate phosphor ($Zn_3(PO_4)_2$:Mn), manganese- and lead-activated calcium silicate phosphor ($CaSiO_3$:Pb, Mn) or manganese-activated zinc silicate phosphor ($Zn_2SiO_4$:Mn), or a mixture thereof can also be used. Furthermore, besides the abovementioned $Y_3Al_5O_{12}$:Ce phosphor, $Y_2SiO_5$:Ce phosphor or CaS:Eu phosphor, and other phosphors such as cerium-activated yttrium aluminate phosphor ($YAlO_3$:Ce), zinc-activated zinc oxide phosphor (ZnO:Zn), or silver- and nickel-activated zinc sulfide phosphor (ZnS:Ag, Ni) or a mixture thereof can be used for the short persistent phosphor. In case visible lights are used for both of emission lights from two kinds of phosphor, it is desirable that both of emission lights have the same or similar color.

What we claim is:

1. A cathode-ray tube having a phosphor screen consisting of a mixture of a long persistent phosphor having a one-tenth persistent time of 10 msec or more and a short persistent phosphor having a one-tenth persistent time of 1 $\mu$sec or less, said phosphor screen producing a monochromatic image in response to simultaneous one electron beam excitation of said long persistent phosphor and said short persistent phosphor, said monochromatic image comprising a sharp rise-up light image from the former and dull rise-up but long persistent light image from the latter.

2. A cathode-ray tube in accordance with claim 1, wherein mixing ratio of said short persistent phosphor in said mixture is 5 to 20 weight %.

3. A cathode-ray tube in accordance with claim 1, wherein said long persistent phosphor is a phosphor selected from the group consisting of $Zn_2SiO_4$:Mn,As phosphor, $MgSiO_3$:Mn phosphor, $Zn_3(PO_4)_2$:Mn phosphor, $CaSiO_3$:Pb,Mn phosphor, and $Zn_2SiO_4$:Mn phosphor.

4. A cathode-ray tube in accordance with claim 1, wherein said short persistent phosphor is a phosphor selected from the group consisting of $Y_3Al_5O_{12}$:Ce phosphor, $Y_2SiO_5$:Ce phosphor, CaS:Eu phosphor, $YAlO_3$:Ce phosphor, ZnO:Zn phosphor, and ZnS:Ag,Ni phosphor.

5. A cathode-ray tube for displaying a picture by impingement of at least one electron beam which is scanned in a predetermined manner, said cathode-ray tube having a phosphor screen consisting of a mixture of a long persistent phosphor having a one-tenth persistent time of 10 msec or more and a short persistent phosphor having a one-tenth persistent time of 1 $\mu$sec or less, wherein mixing ratio of said short persistent phosphor in said mixture is 5 to 20 weight %, said phosphor screen producing a monochromatic image in response to simultaneous one electron beam excitation of said long persistent phosphor and said short persistent phosphor, said monochromatic image comprising a sharp rise-up light image from the former and a dull rise-up but long persistent light image from the latter.

6. A cathode-ray tube in accordance with claim 5, wherein said long persistent phosphor is a phosphor selected from the group consisting of $Zn_2SiO_4$-Mn,As phosphor, $MgSiO_3$:Mn phosphor, $Zn_3(PO_4)_2$:Mn phosphor, $CaSio_3$:Pb,Mn phosphor and $Zn_2SiO_4$:Mn phosphor.

7. A cathode-ray tube in accordance with claim 5, wherein said short persistent phosphor is a phosphor selected from the group consisting of $Y_3Al_5O_{12}$:Ce phosphor, $Y_2SiO_5$:Ce phosphor, CaS:Eu phosphor, $YAlO_3$:Ce phosphor, and ZnS:Ag,Ni phosphor.

* * * * *